(12) United States Patent
Koma et al.

(10) Patent No.: US 6,192,940 B1
(45) Date of Patent: Feb. 27, 2001

(54) HOSES FOR ELECTRIC CLEANER

(75) Inventors: Tadashi Koma; Norihisa Yamaguchi, both of Tochigi; Hidenori Shima, Kobe, all of (JP)

(73) Assignee: Tigers Polymer Corporation, Osaka (JP)

( * ) Notice: Subject to any disclaimer, the term of this patent is extended or adjusted under 35 U.S.C. 154(b) by 0 days.

(21) Appl. No.: 09/438,380

(22) Filed: Nov. 12, 1999

Related U.S. Application Data

(63) Continuation-in-part of application No. 09/136,293, filed on Aug. 19, 1998, now abandoned.

(30) Foreign Application Priority Data

| Aug. 20, 1997 | (JP) | ..................................... 9-238954 |
| Mar. 3, 1999 | (JP) | .................................. 11-055450 |
| Sep. 2, 1999 | (JP) | .................................. 11-248691 |

(51) Int. Cl.$^7$ ................................................. F16L 11/115
(52) U.S. Cl. ......................... 138/122; 138/126; 138/127; 138/133; 138/144; 138/153
(58) Field of Search ................................... 138/122, 126, 138/133, 144, 153, 127

(56) References Cited

U.S. PATENT DOCUMENTS

| 2,898,942 | * | 8/1959 | Rothermel | ............................. 138/122 |
| 2,949,133 | * | 8/1960 | Rothermel et al. | ................... 138/122 |
| 2,986,169 | * | 5/1961 | McCormick | ........................ 138/122 |
| 2,998,474 | * | 8/1961 | Pavlic | ................................... 138/133 |
| 3,080,891 | * | 3/1963 | Duff | ..................................... 138/122 |
| 4,490,575 | * | 12/1984 | Kutnyak | ............................... 138/129 |
| 5,555,915 | * | 9/1996 | Kanao | ................................. 138/122 |
| 5,647,400 | * | 7/1997 | Jani et al. | ............................ 138/126 |
| 5,778,941 | * | 7/1998 | Inada | .................................. 138/127 |
| 5,918,642 | * | 7/1999 | Akedo et al. | ........................ 138/129 |
| 6,024,134 | * | 2/2000 | Akedo et al. | ........................ 138/122 |

\* cited by examiner

*Primary Examiner*—James Hook
(74) *Attorney, Agent, or Firm*—Pillsbury Madison & Sutro LLP

(57) ABSTRACT

A hose comprises a hose wall comprising a soft synthetic resin and a hard spiral reinforcement fused with or bonded to the hose wall for retaining the hose configuration. The hose wall comprises at least one layer of a chlorine-free thermoplastic elastomer such as a polystyrenic thermoplastic elastomer, a polyolefinic thermoplastic elastomer and a polyurethane-series thermoplastic elastomer. The reinforcement comprises a hard wire and a covering resin layer formed on the hard wire. The hose wall and the covering resin layer are formed with the same series elastomer. This hose is lighter and free from PVC resins, and has the same flexibility as that of the conventional PVC hoses.

7 Claims, 3 Drawing Sheets

1

HOSES FOR ELECTRIC CLEANER

FIELD OF THE INVENTION

This application is a continuation-in-part of U.S. patent application Ser. No. 09/136,293, filed on Aug. 19, 1998, now abandoned which is incorporated herein by reference.

The present invention relates to a hose for electric cleaner made of a synthetic resin and having excellent flexibility, which is formed into a bellows configuration.

BACKGROUND OF THE INVENTION

Hoses mainly formed with a polyvinyl chloride resin (PVC) have been usually used because of their excellence in thermal moldability and low production cost. For example, there are known hoses comprising a hose wall and a hard wire reinforcement which is covered with a resin and united with the hose wall. The hose is produced by spirally winding a hard wire reinforcement covered with a PVC resin on a mandrel, covering the covered reinforcement with a tube of a soft PVC resin or spirally winding a tape of a soft PVC resin on the covered reinforcement to form a hose wall, and separating from the mandrel.

However, there have arisen global environmental problems in recent years, such as poisonous gases generated by burning PVC waste, an acid rain caused thereby and the fact that the PVC itself is considered as a carcinogen. Thus, there is a trend toward a restriction on the use of the PVC resin. Moreover, there have been problems in hoses made of PVC resins in that they are rather heavy and difficult to handle.

SUMMARY OF THE INVENTION

Therefore, an object of the present invention is to provide a hose for an electric cleaner which is lighter and free from PVC with maintaining the same flexibility as that of the conventional PVC hoses.

It is another object of the present invention to provide a hose which ensures the inhibition of the tearing or damage of the covering layer for the hard wire even when the hose is produced by spirally winding a hard wire reinforcement on a mandrel.

It is still another object of the present invention to provide a hose having a improved adhesion strength between a hose wall and a spiral reinforcement.

The present invention provides the following hose or tube structures to accomplish the above objects.

(1) A hose for an electric cleaner which comprises a hose wall comprising a soft or flexible synthetic resin, and a hard spiral reinforcement fused with or bonded to the hose wall, wherein the hose wall comprises at least one layer of a chlorine-free thermoplastic elastomer (e.g., polystyrenic thermoplastic elastomers, polyolefinic thermoplastic elastomers and polyurethane-series thermoplastic elastomers (TPUs)), the hard spiral reinforcement comprises a hard wire (e.g., a hard steel wire) and at least one covering resin layer formed thereon, and the innermost layer of the hose wall and an outer layer of the covering resin layer are formed with a polymer of the same series. According to the present invention, a light and PVC-free hose can be realized by using, as the soft synthetic resin for the hose wall, the thermoplastic elastomer which is lighter than the PVC resin and has similar flexibility to that of the PVC resin.

(2) The hose wall may have a laminated structure (or a multi-layered structure) comprising an inner layer of a polystyrenic thermoplastic elastomer and an outer layer of a polyolefinic resin. Even if an oil as a softening agent being liable to bleed out to the surface in an environment of high temperatures and humidity and to cause troubles such as tackiness is added to the polystyrenic thermoplastic elastomer, no problem arises in the handling or operation of the hose. Because the outer layer constituting the surface of the hose is formed with the polyolefinic resin (such as a polyolefinic thermoplastic elastomer and an ethylene-vinyl acetate copolymer (EVA)) which can be produced without addition of the oil. In this case, it is preferable to form the outer layer thinner than the inner layer to improve or maintain high flexibility.

(3) The hose wall may have another laminated structure (or a multi-layered structure) comprising a layer formed with a polyester-series polyurethane thermoplastic elastomer (TPU) and a layer formed with a polyether-series polyurethane thermoplastic elastomer (TPU). Since the hose wall is formed with TPUs and comprises the polyether-series TPU layer which is excellent in physical properties such as water resistance and weather resistance, and the polyester-series TPU layer which is inexpensive, expression of various excellent characteristics of the TPU can be ensured at low cost.

(4) The covering resin layer may comprise at least one layer formed with at least one member selected from a polystyrenic thermoplastic elastomer, a polyolefinic thermoplastic elastomer, a polyolefinic resin, and a polyurethane-series thermoplastic elastomer. The hard spiral reinforcement may comprise a hard wire and a polyolefinic resin layer covering the hard wire. These hoses being light and substantially free from PVC resins can be realized, because the reinforcement wire is also covered with the polyolefinic resin or the chlorine-free thermoplastic elastomer.

(5) The hardness of the covering resin layer may be higher than the hardness of the hose wall (the wall is formed with, for example, the chlorine-free thermoplastic elastomer). Since the hard wire (e.g., hard steel wire) is covered with the covering layer having high hardness, for example, even if the reinforcement wire is wound tight around a molding shaft such as a mandrel, the tearing or damage of the covering resin layer can be inhibited effectively.

(6) The hard spiral reinforcement may comprise a hard wire (e.g., hard steel wire), a multi-layer formed on the hard wire (e.g., a covering inner layer formed on the hard wire and a covering outer layer on the covering inner layer). The hardness of the innermost covering layer of the multi-layer (e.g., the covering inner layer) may be higher than the hardness of the outer covering layer of the multi-layer (e.g., the covering outer layer). According to the above embodiment (6), the prevention of deformation or breakage of the covering layer is further ensured by forming the covering layer of the reinforcement into a multi-layered (e.g., double-layered) structure, and employing, as the resin for the innermost layer, the resin having a hardness higher than that of the resin for the outer layer, thereby to increase the hardness of the resin covering layer as a whole.

(7) The hose wall and the covering resin layer for the reinforcement may be formed with the same series chlorine-free thermoplastic elastomer. For example, the hose wall may be formed with a polyurethane-series thermoplastic elastomer (TPU), and the covering resin layer may be formed with a polyurethane-series thermoplastic elastomer (TPU). Since the hose wall (specifically, the innermost layer thereof) and the covering resin layer (specifically, the outer layer thereof) for the hard spiral reinforcement are formed with chlorine-free thermoplastic elastomers (e.g., TPU) of the same series, the covering resin layer can be firmly bonded or fused with the hose wall with easy manner.

(8) The hard spiral reinforcement may comprise an electrical wire covered or coated with a resin (e.g., a polyolefinic resin), a hard wire disposed adjacent to the electrical wire, and a covering resin layer (comprising, e.g., a polyurethane-series thermoplastic elastomer) which covers or closely wraps the resin covered electrical wire and the hard wire. According to the embodiment (8), the hard spiral reinforcement comprise the electrical wire such as a twisted copper wire having an insulating cover of the resin (e.g., a polyolefinic resin), the hard wire disposed adjacent to the electrical wire, and the covering resin layer (e.g., TPU) which covers or is firmly adhered to the resin covered electrical wire and the hard wire. Therefore, a lighter hose substantially free from PVC can be realized for an electric cleaner which provided with an electric circuit utilizing the hard wire (e.g., a hard steel wire), an electric circuit utilizing the covered electric wire, independently.

DETAILED DESCRIPTION OF THE INVENTION

Hereinafter, embodiments of the present invention will be illustrated with reference to the drawings.

Figure 1:
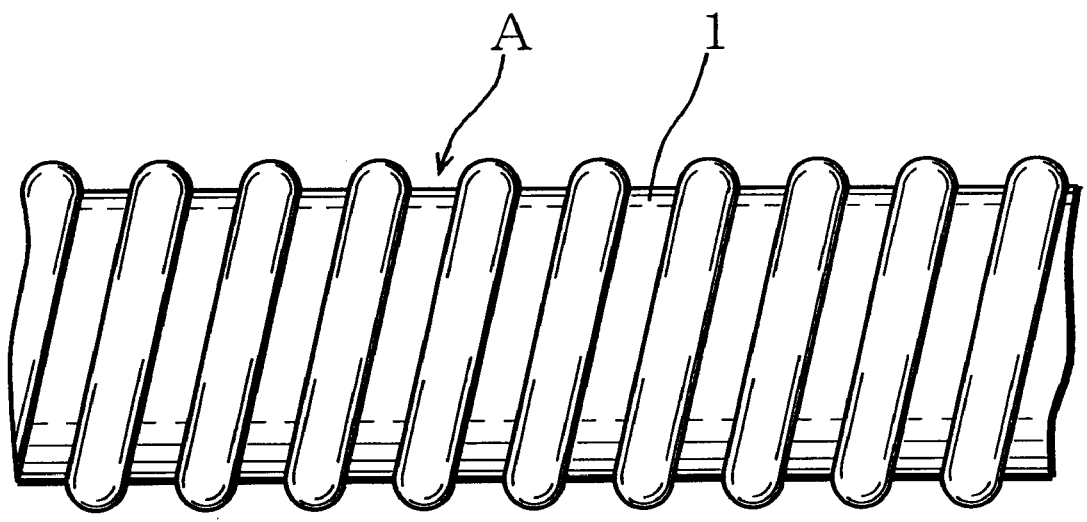
FIG. 1 is a front view of the hose of the present invention.
Figure 2:
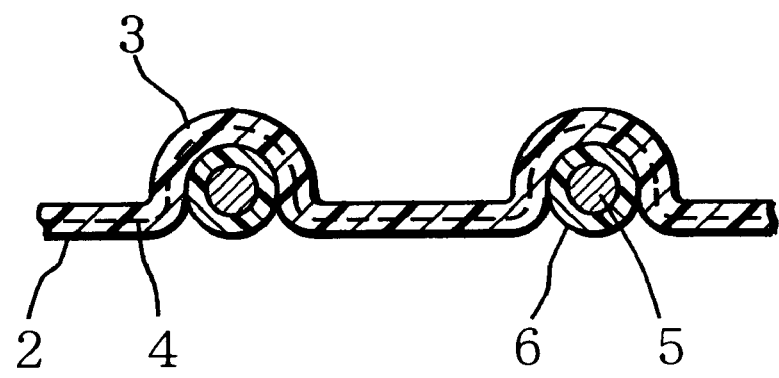
FIG. 2 is a partially enlarged sectional view of the hose wall.
Figure 5:
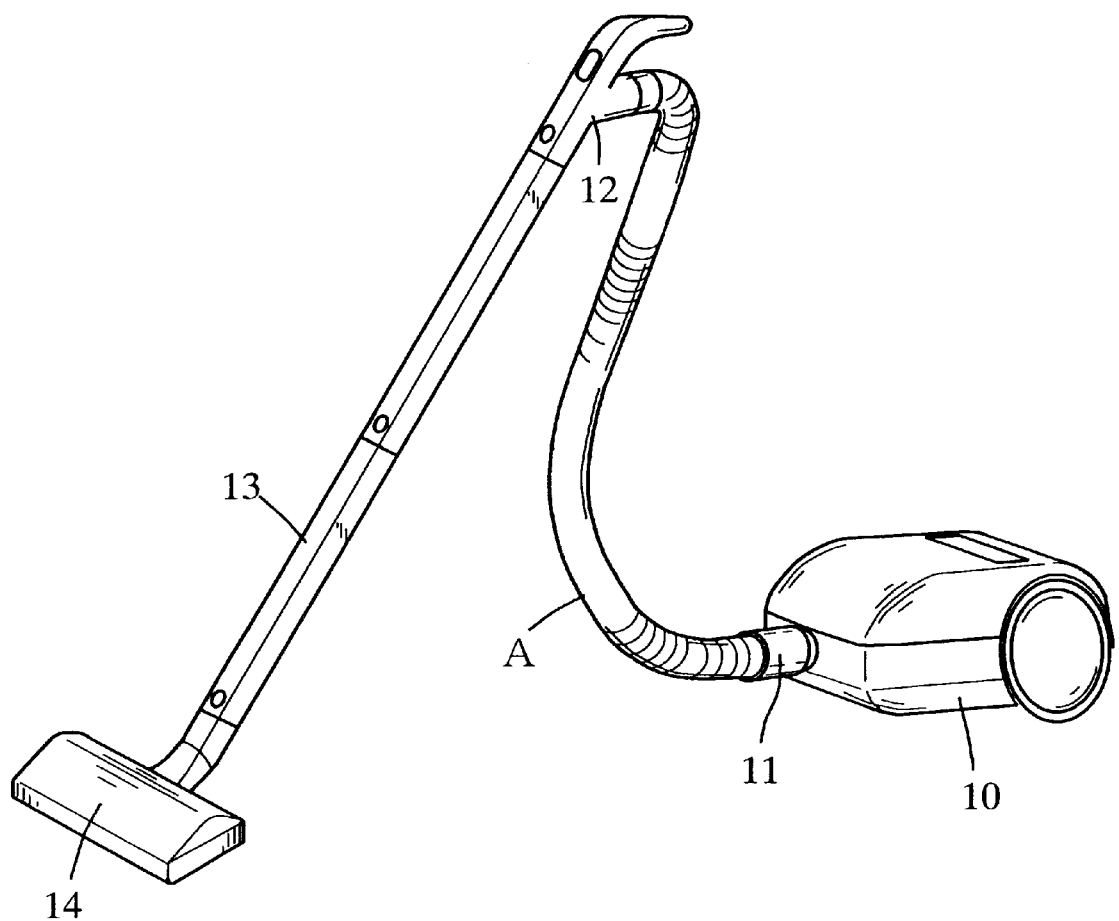
FIG. 5 is a perspective view of an electric cleaner.

FIG. 1 is a front view of the hose of the present invention, and FIG. 2 is a partially enlarged sectional view of the hose wall. FIG. 5 is a perspective view of an electric cleaner.

An electric cleaner shown in FIG. 5 comprises, for example, a main body 10 having a suction port, a joint pipe 11 connected to the suction port of the main body 10, a hose A in which one end is detachably connected to the joint pipe 11, a grip 12 jointed to the other end of the hose A and provided with an operation unit, at least one extension pipe 13 detachably connected to the grip 12, and a suction unit 14 attached to the end of the extension pipe 13 and provided with a brush.

In the hose A for an electric cleaner, as shown in FIG. 1 and FIG. 2, the hose wall 1 comprising a soft or flexible synthetic resin or elastomer has a bellows configuration and is reinforced to retain its configuration or shape by bonding or fusing the hard spiral reinforcement comprising a hard wire 5 covered with a covering resin layer 6 at a double pitch.

The hose wall 1 is fused with or bonded to the covering resin layer 6, and has a laminated (e.g., multi-layered) structure composed of an inner layer 2 comprising a polyether-series polyurethane thermoplastic elastomer and an outer layer 3 comprising a polyester-series polyurethane thermoplastic elastomer. Moreover, a plurality of reinforcing strings 4 such as nylon strings are interposed between the inner layer 2 and the outer layer 3 along with the axial direction of the hose.

Further, the covering resin layer 6 comprises the same series polyurethane thermoplastic elastomer (a polyester- or poyether-series TPU). Furthermore, the covering layer 6 has higher hardness than the hose wall 1. The hose wall 1 may have a hardness of about 40 to 80, preferably about 50 to 70, and more preferably about 60 to 70. The hardness of the covering layer 6 can be selected in accordance with the hardness of the hose wall 1 and may for example be about 70 to 95 (e.g., 80 to 95). The hardness can be determined in accordance with a hardness test [spring hardness test (A-type)] defined in the Japanese Industrial Standards (JIS) K 6301.

According to the above embodiment, a light and PVC-free hose can be realized with improving the fused or adhesion strength between the hose wall 1 and the reinforcement and with inhibiting the tearing or deformation of the covering resin layer 6.

The layer structure of the covering resin layer is not particularly limited to a specific structure and may be a multi-layered structure.

Figure 3:
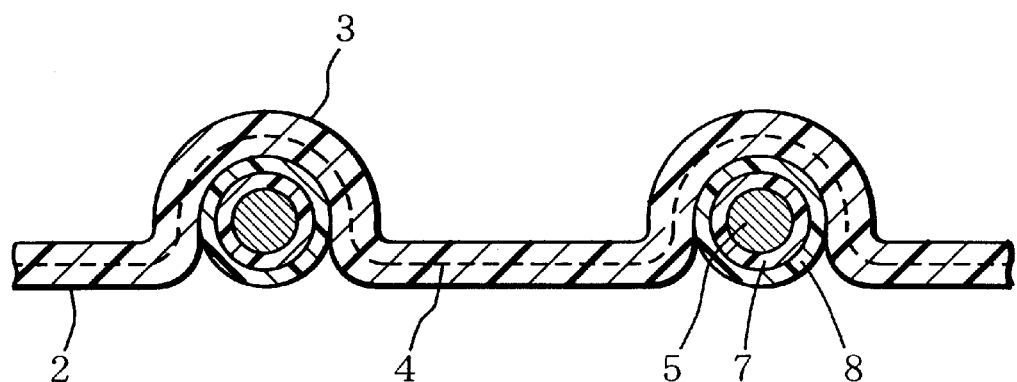
FIG. 3 is a partially enlarged sectional view of the hose wall of another embodiment.

In FIG. 3 showing another embodiment, to the hose wall 1 as mentioned above is fused or bonded intimately a hard spiral reinforcement. The hard spiral reinforcement comprises a hard wire (core) 5 and has a two-layered structure comprising a covering resin inner layer 7 formed on the surface of the hard wire and a covering resin outer layer 8 formed on the inner layer.

The inner layer 7 is formed with a polyolefinic resin having a high hardness such as polyethylenes and polypropylenes, and the outer layer 8 is formed with the same-series material TPU as the innermost layer material of the hose wall 1. Thus, the fused or adhesion strength between the wall 1 and the reinforcement can be enhanced remarkably.

Moreover, in the hose shown in FIG. 3, the inner layer 7 has a hardness higher than the outer layer 8. As the resin for the inner layer, use can be made of polyolefinic resins having a hardness determined in accordance with the above hardness test, of e.g., around 98 (about 95 to 99). Therefore, the covering layer can be more effectively prevented from the deformation or breakage since the covering resin layer comprises a plurality of layers and the hardness of the covering resin layer can be increased by using the harder inner layer. Thus, the covering resin layer comprising a plurality of layers readily imparts both high protection hardness and high intimate adhesion with the hose wall to the hard spiral reinforcement.

[Hose Wall]

Insofar as the hose wall comprises a chlorine-free soft or flexible resin or elastomer and at least one layer of a chlorine-free thermoplastic elastomer, the material for the hose wall is not particularly restricted and may comprise various thermoplastic elastomers (e.g., a polystyrenic thermoplastic elastomer, a polyolefinic thermoplastic elastomer and a polyurethane-series thermoplastic elastomer) and soft synthetic resins such as chlorine-free resins (e.g., polyolefinic resins). The polyurethane-series thermoplastic elastomer (TPU) includes, for example, a polyester-series TPU, a polyether-series TPU or the like. These elastomers and/or resins can be used singly or in combination.

Incidentally, the hose wall may be not only the above two-layered structure shown in FIGS. 2 and 3, but also a single-layered structure comprising the chlorine-free thermoplastic elastomer or a multilayered structure (a laminated structure) having a plurality of layers not less than two layers. Further, the multi-layered structure may have an intermediate layer between an innermost layer and an outermost layer.

The multi-layered or laminated structure may be formed with a suitable combination of resins and/or elastomers, and the combination is not particularly restricted. In the hose wall having a plurality of layers, examples of the combination of the layers may include (1) a combination of the elastomer layer and the chlorine-free resin layer such as the polyolefinic resin layer, (2) a combination of a plurality of thermoplastic elastomer layers (e.g., a combination of the polyolefinic elastomer layer and the polystyrenic elastomer layer, or a combination of the polyester-series TPU layer and the polyether-series TPU layer).

In the multi-layered structure, an inner layer of the hose wall may comprise a thermoplastic elastomer (e.g., a polystyrenic elastomer, a polyolefinic elastomer and a polyurethane-series elastomer) and an outer layer may be formed with such thermoplastic elastomer or a polyolefinic resin.

The inner layer of the hose wall may preferably be formed with the polystyrenic thermoplastic elastomer from the economical aspect, and an outer layer may comprises the polyolefinic resin to inhibit the bleeding out of an oil as a softening agent added to the inner layer.

When forming the outer layer with the polyolefinic resin, since the flexibility of the polyolefinic resin is not sufficient, it is preferable to form the outer layer as thin as possible. Accordingly, the thickness of the outer layer formed with the polyolefinic resin can be selected from the ranges, for example, about 1 to 20,000 $\mu$m, preferably 5 to 15,000 $\mu$m and particularly 10 to 10,000 $\mu$m.

Further, preferred combinations include, for example, a combination of TPUs (e.g., the polyester-series TPU and the polyether-series TPU). Thus, the laminated structure may comprise, for example, a layer comprising a polyester-series polyurethane thermoplastic elastomer and a layer comprising a polyether-series polyurethane thermoplastic elastomer. When the hose wall is formed with TPUS, the inner layer and the outer layer of the hose wall can be formed with any series of the polyester-series TPU and the polyether-series TPU. Since the polyether-series TPU has high weather resistance and light resistance, it may be used for the outer layer. Moreover, since some polyester-series TPUs are relatively hydrolyzed, it is preferable to use the polyester-series TPU not for the inner layer it might have contact with water, but for the outer layer. Thus, as mentioned above, the polyether-series TPU preferably forms the inner layer, and the polyester-series TPU preferably constitutes the outer layer of the hose wall.

The hose wall 1 may have advantageously a hardness of about 40 to 80, preferably about 40 to 70 (e.g., 60 to 70), particularly about 40 to 60 (e.g. thermoplastic elastomers or olefininc resins) determined in accordance with a hardness test [spring hardness test (A-type)] defined in the Japanese Industrial Standards (JIS) K 6301.

[Hard Spiral Reinforcement]
(Hard Wire)

The hard spiral reinforcement comprises a hard wire and a covering resin layer formed on the hard wire.

The hard wire (core) may be or be formed with a metal wire [e.g., a steel wire (a piano wire, etc.)].

(Covering Resin Layer)

The covering resin layer comprises at least one layer and may have a single-layer structure or a multi-layered or laminated structure so far as the outermost layer of the covering resin layer comprises the same series polymer as the innermost layer of the hose wall. The multi-layered or laminated structure of the covering resin layer comprises, an inner resin layer formed on the hard wire and an outer resin layer on the inner resin layer, and if necessary, an intermediate layer may be interposed between the inner layer and the outer layer.

The resin forming the covering resin layer is not particularly restricted so long as it is a chlorine-free resin or polymer and the innermost layer .comprises the same series resin or elastomer as the hose wall. The chlorine-free resin may include, for example, a polyolefinic resin or the like, and the chlorine-free thermoplastic elastomer includes, for example, a polystyrenic thermoplastic elastomer, a polyolefinic thermoplastic elastomer, a polyurethane-series thermoplastic elastomer or the like. These materials can be used singly or in suitable combination. The polymer such as the above elastomers (the polystyrenic thermoplastic elastomer, the polyolefinic thermoplastic elastomer and TPU) and the polyolefinic resin are preferably used for the covering resin layer.

Among these materials, the polyolefinic resin is preferably used for covering the hard wire.

Further, the multi-layered or laminated structure of the covering resin layer may be formed with a suitable polymer combination, and the species of the resin or elastomer are not particularly restricted and can be selected from those mentioned for the covering resin layer.

The inner resin layer preferably comprises a harder resin (e.g., a polyolefinic resin such as polyethylenes and polypropylenes) or elastomer than the hose wall or the outer layer of the covering layer, and the outer resin layer preferably comprises the same series resin or elastomer (particularly, the same elastomer) as the inner or innermost layer material of the hose wall. The material for the outer resin layer includes, for example, chlorine-free thermoplastic elastomers being the same series resin as the resin for the wall, such as polystyrenic thermoplastic elastomers, polyolefinic thermoplastic elastomers, and TPUs, e.g., polyesterseries and polyether-series TPUS. The outer or outermost resin layer of the covering layer preferably comprises TPUs.

In the present invention, the innermost layer of the hose wall and the outermost layer of the covering resin layer are formed with a polymer of the same series. In more details, the covering resin layer (i.e., the layer of the covering resin layer to be contacted directly with the hose wall, or the outermost layer) is formed with the polymer (e.g., the elastomer) of the same series as that forming the hose wall (i.e., the layer of the hose wall to be contacted directly with the covering resin layer, or the innermost layer). Therefore, the covering resin layer and the hose wall are readily bonded or fused with high adhesion strength.

In the preferred embodiment, the hose wall comprises a polyurethane-series thermoplastic elastomer, and the covering resin layer comprises a polyurethane-series thermoplastic elastomer.

The hardness ratio of the covering resin layer relative to the hose wall is not particularly limited so far as the covering resin layer can be prevented from the breakage, and the hardness of the covering resin layer is preferably higher than the hardness of the hose wall.

When the covering resin layer comprises a plurality of layers, the hardness of the covering resin layer as a whole can be increased by using, as the resin or elastomer for the inner layer, a material harder than the elastomer for the outer one. Thus, it is practically preferable to form the inner layer with a resin or elastomer having a hardness higher than that of the resin or elastomer forming the outer layer.

The hardness of the covering resin layer or the innermost layer of the covering resin layer may for example be about 60 to 100, preferably about 70 to 99 (for example, about 70 to 95) and more preferably about 80 to 99 determined in accordance with the above hardness test.

According to the covering resin layer comprising a plurality of layers, the tearing or damage of the resin covering layer can be effectively prevented, and high intimate adhesion with the hose wall to the hard spiral reinforcement can be accomplished.

[Thermoplastic Elastomer]

As the thermoplastic elastomer for the hose wall or the covering resin layer, there may be mentioned various non-chlorine-containing elastomers comprising a hard segment and a soft segment, such as a polystyrenic thermoplastic elastomer, a polyolefinic thermoplastic elastomer, a polyurethane-series thermoplastic elastomer (TPU) a polyester-series thermoplastic elastomer, a polyamide-series elastomer and the like. The thermoplastic elastomer may be used either singly or in combination of two or more. As the elastomer, it is preferable to use an elastomer having similar or higher flexibility to that of PVC.

Incidentally, the hardness of the elastomer (e.g., TPUs) can be controlled by varying the species or the amount of the hard segments and/or the soft segments.

As the polystyrenic thermoplastic elastomer, there may be used a styrene-butadiene-styrene block copolymer (SBS resin), a styrene-isoprene-styrene block copolymer (SIS resin), a styrene-ethylene-butylene-styrene block copolymer (SEBS resin), a styrene-ethylene-propylene-styrene block copolymer (SEPS).

As the polyolefinic thermoplastic elastomer, a blend or mixture comprising a polyolefine such as a polyethylene and a polypropyrene, and a soft segment component (rubber phase) such as an ethylene-propylene rubber (EPM, EPDM), a nitrile rubber, a natural rubber and a butyl rubber is typically used. The rubber phase may be crosslinked with a crosslinking agent such as a peroxide.

As the polyolefinic thermoplastic elastomer, it is preferable to use one that is of very light weight and high flexibility and has high moldability or processability.

The polyurethane-series thermoplastic elastomer (TPU) includes polyester-series polyurethane elastomers (polyester-series TPUS) and polyether-series polyurethane elastomers (polyether-series TPUs). The species of a polyol component as a soft segment constituting a polyurethane determines whether the TPU is a polyester-series one or a polyether-series one. The former means TPUs having a polyester polyol unit or segment and the latter means TPUs having a polyether polyol unit or segment. These TPUs may include a blend or mixture of the base TPU blended with thermoplastic resins such as polyamides, provided that the characteristics or properties of the TPU does not adversely affected by the addition of the resin.

The polyester-series TPU and the polyether-series TPU are prepared by reacting a polyisocyanate component (particularly, diisocyanate component) with a polyol component (particulalry, a diol component), e.g., with a polyester polyol or a polyether polyol. If needed, a diamine component may be used as a chain extending agent.

The diisocyanate component includes, for example, aromatic diisocyanates (e.g., phenylene diisocyanate, tolylene diisocyanate, diphenylmethane-4,4'-diisocyanate), aromatic aliphatic diisocyanates (e.g., xylene diisocyanate), alicyclic diisocyanates (e.g., isophorone diisocyanate), and aliphatic diisocyanates (e.g., 1,6-hexamethylene diisocyanate, lysine diisocyanate). The diisocyanate component may be used either singly or in combination.

As the diol component, there may be exemplified polyester diols, polyether diols (e.g., polyether diols having an oxy-$C_{2-4}$alkylene unit, such as polyoxytetramethylene glycol) and polycarbonate diols. The polyol component can be used either singly or in combination.

The polyester diol may be derived from aliphatic diols (e.g., $C_{2-10}$alkylene diols such as ethylene glycol and propylene glycol; polyoxy $C_{2-4}$alkylene glycols such as diethylene glycol, triethylene glycol and polyoxytetramethylene glycol) and dicarboxylic acids or reactive derivatives thereof (e.g., $C_{4-20}$aliphatic dicarboxylic acids such as adipic acid and sebacic acid, aromatic dicarboxylic acids such as phthalic acid and isophthalic acid). The polyester diol may be derived from a lactone which may be used with the diol component and/or the dicarboxylic acid.

[Chlorine-free Resin]

The chlorine-free resin for the hose wall or the covering resin layer may be a polyolefinic resin, a polyurethane-series resin, a rubber (e.g., ethylene-propylene copolymer rubber, ethylene-propylene-diene copolymer rubber) or the like, for realizing a PVC-free hose. The olefinic resin is preferred.

As the polyolefinic resin, there may be used a resin which causes no tackiness on its surface, such as polyethylenes (e.g. low-density, medium density, high-density or linear low-density polyethylenes), a polypropylene, an ethylene-propylene copolymer, an ethylene-(meth)acrylate copolymer, an ethylene-(meth)acrylic acid copolymer, an ethylene-vinyl acetate copolymer (EVA) and other known materials.

The hardness of the non-chlorine resin may usually depend on the species of the materials and may be controlled by the species or amount of the constituting component.

The layer(s) constituting the hose wall and the covering resin layer may contain various additives such as a plasticizer or softening agent, a stabilizer (e.g. antioxidants, ultraviolet light absorbents, heat stabilizers), an antistatic agent, a flame retardant, a lubricant, a colorant, a filler and delustering agent.

The present invention is not restricted only to the hose of the embodiments above [two spiral reinforcements (wound at a double pitch)], and the hose wall may have a single-layered structure comprising the thermoplastic elastomer. Furthermore, the hose may be a single-wire hose in which a single hard spiral reinforcement is spirally wound or a multi-wire hose in which three or more hard spiral reinforcements are used.

Figure 4:
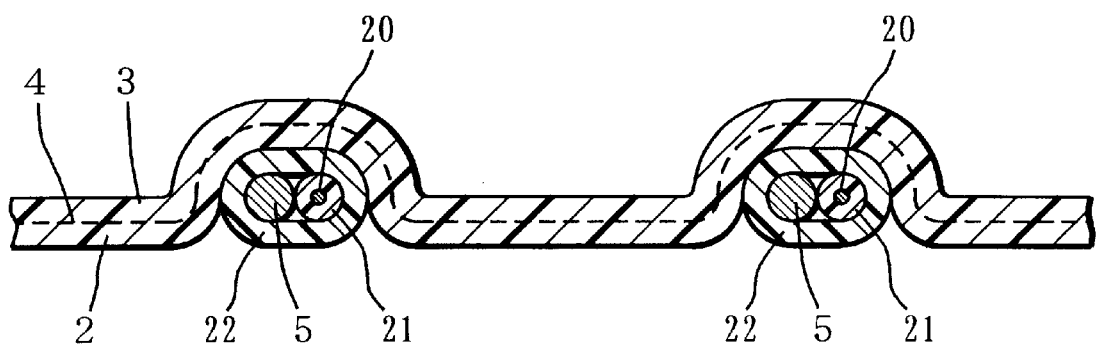
FIG. 4 is a partially enlarged sectional view of the hose wall of still another embodiment.

In FIG. 4 showing still another embodiment, the hose comprises the hose wall 1 comprising the inner layer 2, the outer layer 3 and the reinforcing strings 4, and a hard spiral reinforcement fused with or bonded to the hose wall 1. The reinforcement comprises an insulating electric wire comprising a electric wire 20 and a resin layer (a insulating layer) 21 formed with a chlorine-free resin, a hard wire (e.g., a hard steel wire) 5 disposed adjacent to the insulating electric wire, and a resin covering layer 22 which covers or firmly adheres to the insulating electric wire and the hard wire 5, at a double pitch.

The electric wire 20 is not particularly restricted, and may be a conductive metal wire such as a copper wire (e.g., a twisted copper wire is preferred because of its strength).

As the chlorine-free resin constituting the insulating layer 21 which covers the electric wire, use can be made of, for example, the above mentioned chlorine-free resin (e.g., polyolefinic resins) and the above mentioned chlorine-free thermoplastic elastomer. Preferred are the polyolefinic resins.

The covering resin layer 22 may comprise the thermoplastic elastomer or the chlorine-free resin as same as described above. Specifically, The covering resin layer 22 preferably comprises TPUS.

Preferably, the covering resin layer 22 may be made highly hard to have the hardness of about 60 (e.g., 50 to 80, preferably about 50 to 70) determined in accordance with a hardness test [spring hardness test (D-type)] defined in the Japanese Industrial Standards (JIS) K 7215. Incidentally, the moldability of the TPU may be improved by blending a thermoplastic resin such as ABS.

In this embodiment, since the resin covering layer 22 is formed with the same series materials (e.g., the same series thermoplastic elastomer) as that of the inner layer 2 which is directly bonded with the resin covering layer, remarkable adhesion or fused strength between the resin covering layer 22 and the inner layer 2 can be realized. Further, the electric wire 20 can be utilized for an electric circuit of an operation unit, and the hard wire (e.g., a hard steel wire) 5 may be used for another electric circuit.

The present invention makes possible the harmless incineration of hoses, as for a PVC resin, which has been difficult to realize, and causes fewer problems. Moreover, the hose of the present invention is lighter than a PVC resin one by 20 to 30% by weight and easy to carry or to handle.

What is claimed is:

1. A hose which comprises a hose wall comprising a soft or flexible resin, and a hard spiral reinforcement fused with or bonded to the hose wall for retaining the hose configuration, wherein said hose wall comprises at least one layer of a chlorine-free thermoplastic elastomer, said hard spiral reinforcement comprises a hard wire and at least one covering resin layer formed on the hard wire, and an innermost layer of the hose wall and the outermost layer of the covering resin layer are formed with a polymer of the same series, and wherein a combination of the hose wall with the covering layer is one of the following combinations (i)–(ii):
(i) a combination of the hose wall having a laminated structure which comprises a layer comprising a polyester-series polyurethane thermoplastic elastomer and a layer comprising a polyether-series polyurethane thermoplastic elastomer, with the covering resin layer comprising an inner resin layer formed on the hard wire and an outer resin layer on the inner resin layer, wherein the inner resin layer comprises a polyolefinic resin and the outer resin layer comprises a polyurethane-series thermoplastic elastomer and the hardness of the inner resin layer is higher than the hardness of the outer resin layer, and
(ii) a combination of the hose wall having a laminated structure which comprises an inner layer comprising a polystyrenic thermoplastic elastomer and an outer layer comprising a polyolefinic resin, with the covering resin layer comprising a polyolefinic resin.

2. A hose as claimed in claim 1, the hardness of the covering resin layer is higher than the hardness of the hose wall.

3. A hose for an electric cleaner according to claim 1, wherein the hard spiral reinforcement comprises an electrical wire covered with a resin, a hard wire disposed adjacent to the resin covered electrical wine, and a covering resin layer which covers both the resin covered electrical wire and the hard wire.

4. A hose for an electric cleaner according to claim 1, wherein the electrical wire is covered with a polyolefinic resin, and the covering resin layer is formed with a polyurethane-series thermoplastic elastomer.

5. A hose as claimed in claim 1, wherein said hose wall has a hardness of 40 to 80 determined in accordance with a spring hardness test (A-type) defined in Japanese Industrial Standards K 6301.

6. A hose as claimed in claim 1, wherein the hose wall is in combination with (i).

7. A hose as claimed in claim 1, wherein the hose wall is in combination with (ii).

* * * * *